Jan. 7, 1936.  J. D. CHESNUT ET AL  2,026,516
TONG
Filed April 27, 1934
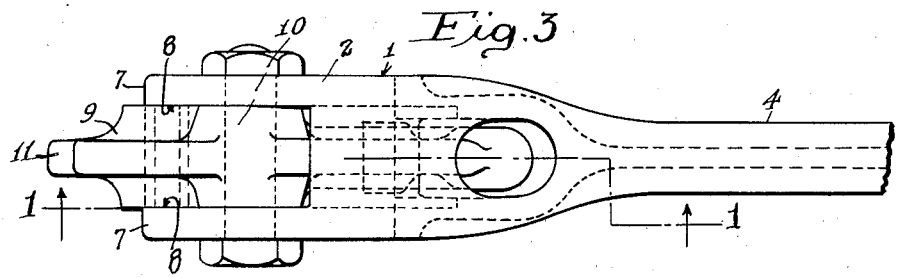
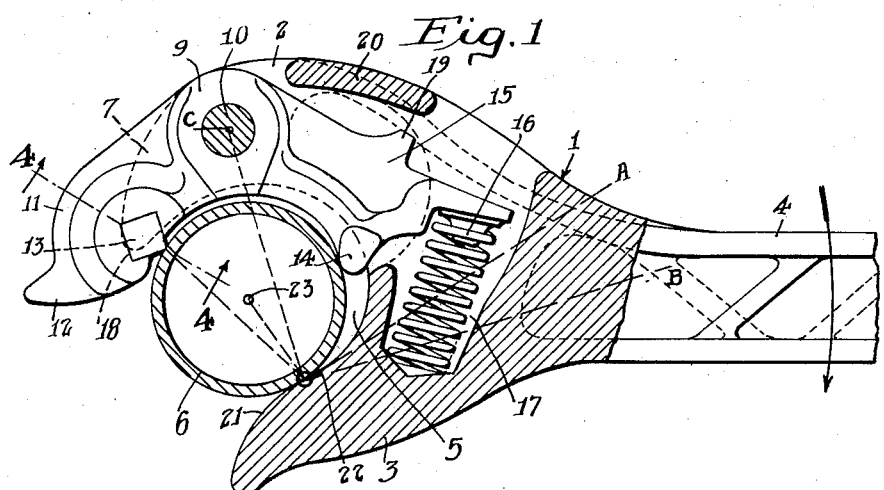
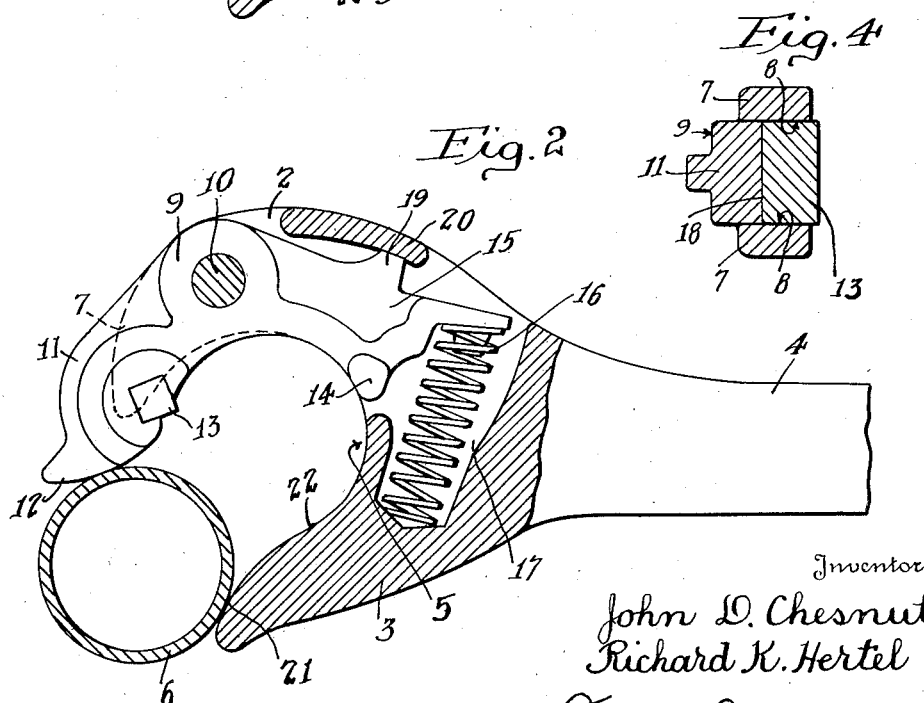
Inventors
John D. Chesnut
Richard K. Hertel
By Lyon+Lyon
Attorneys Patented Jan. 7, 1936

2,026,516

UNITED STATES PATENT OFFICE 2,026,516

TONG

John D. Chesnut and Richard K. Hertel, Los Angeles, Calif., assignors to Byron-Jackson Co., Los Angeles, Calif., a corporation of Delaware Application April 27, 1934, Serial No. 722,726

8 Claims. (Cl. 81—99)

This invention relates to pipe tongs, and while the invention may be employed in the construction of tongs for any purpose whatever, the invention is particularly useful when applied to tubing tongs, such as are used for screwing and unscrewing oil well tubing. This tool is a hand tool, and it must be light in weight, simple in action, easy to apply to a pipe, and readily removable from the pipe; these tongs must have great leverage in the jaws, and yet they must not crush or mark the pipe excessively. Furthermore, such a tool must be constructed so that it will maintain itself on the pipe, and not fall off when the operator of the tool lets go of its handle. These tools are constructed so that they will slip readily around the pipe or tubing when the handle is swung in a backward direction, and they must be constructed so that they will not fall off of the pipe in this reverse movement. Such a tool also must be relatively inexpensive.

One of the objects of the invention is to meet these requirements.

In its general construction, this tong involves the use of a head having a pair of oppositely disposed prongs or forks, between which a deep U-shaped socket is formed to receive the pipe. One of the tongs is provided with a pivoted jaw having means for engaging the side of the pipe at two separated points. At the outer point we provide a hard steel member or bit, to bite into the side of the pipe, and opposite this bit the opposite prong is provided with an inclined face that cooperates with the bit when the handle is rotated in a forward direction to clamp the pipe, so that it can be rotated by the handle.

One of the objects of the invention is to provide a head in which the clamping face referred to above will have an angle, which insures that the head will grasp a pipe, and which will insure that the head can grip the tubing securely, even if the tubing is considerably out of round; also to provide an angle for this clamping face, which will enable the same to operate effectively to clamp the pipe even after this face has become considerably worn.

A further object of the invention is to provide a construction for the head of the tong, which will insure that when the pipe is in the socket, the line joining the bit to the point of contact of the pipe with the opposite prong, will lie considerably outside of the center of the pipe. In other words, we provide a construction which enables the pipe to be clamped throughout more than 180° of its circumference, thereby insuring that the pipe will not come out of the socket when the handle is given its reverse movement. This enables the tong to have an effective "ratchet" action in screwing up or unscrewing a pipe section.

A further object of the invention is to provide an angle for the clamping face, which will facilitate the redressing of the prong after it becomes considerably worn.

A further object of the invention is to provide simple means for retaining the bit in the pivoted jaw which carries it.

Further objects of the invention will appear hereinafter.

The invention consists in the novel parts and combination of parts to be described hereinafter, all of which contribute to produce an efficient tong.

A preferred embodiment of the invention is described in the following specification, while the broad scope of the invention is pointed out in the appended claims.

In the drawing:

Figure 1 is a horizontal section through the tong embodying our invention, the handle being shown in elevation and partially broken away. This view may be considered a section taken on the line 1—1 of Fig. 3. This view illustrates a piece of tubing held in the socket of the tong.

Fig. 2 is a view similar to Fig. 1, but illustrating the parts in the relation they have when a piece of tubing is being introduced into the socket.

Fig. 3 is an elevational view of the head of the tong, the handle of the tong being broken away.

Fig. 4 is a vertical cross section taken about on the line 4—4 of Fig. 1, and particularly illustrating the means employed for retaining the bit that engages the side of the pipe or tubing.

Referring more particularly to the parts, 1 indicates the tong head, which comprises a pair of oppositely disposed prongs or forks 2 and 3, which may project in a slightly inclined direction with respect to the longitudinal axis of the tong handle 4. In this way, a deep U-shaped socket 5 is formed for receiving the pipe or tubing 6. The prong 2 is preferably of arcuate form, terminates in a tapered bill 7, and is preferably bifurcated so that it presents two separated flanges 8, and between these flanges an arcuate jaw 9 is pivotally mounted on a removable pin or bolt 10. This arcuate jaw 9 conforms in its curvature to the arcuate prong 2 and has an outer extension 11 with a curved guide lip 12 cooperating with the opposite prong 3 in guiding the pipe into the socket, as illustrated in Figure 2, and beyond this curved lip a bit 13 is provided. This jaw has means for engaging the side of the pipe at two points: at one point the bit 13 engages the side of the pipe, and at another point on the other side of the pivot bolt 10, the other end of the jaw is formed with a pad or cheek 14, for engaging the pipe. This pad or cheek 14 is formed on the tail portion 15 of the jaw, and against the end of this tail the coil spring 16 thrusts, said spring being carried in the spring chamber 17 formed in the head, preferably in an inclined direction as illustrated. The bit 13 is preferably of angular or square form in cross section, as illustrated, and is received in a bit socket or angular notch 18 formed in the inner edge of the jaw, so that one of the angles of the bit projects inwardly beyond the inner edge of the jaw. This bit is in the form of a short block, and is located between the flanges 8 at all times, even when the jaw is held in its extreme inward position, as illustrated in Fig. 2. On this account the flanges 8 will always prevent the bit from falling out of the notch 18.

In order to limit the swinging movement of the jaw at this point, we provide a suitable stop for the jaw. This stop is preferably in the form of an abutment or projection 19 on the outer edge of the tail portion 15 that engages the inner face of an arc-shaped web 20 that connects the flanges 8.

Opposite the curved lip 12, the prong 3 terminates in a curved guide lip 21, which cooperates with the lip 12 to guide the tong into position over the tubing. When the tong is fully applied to the tubing, the periphery of the tubing engages the bit 13, and also engages the pad or cheek 14, as illustrated in Fig. 1. At this time, the periphery of the pipe at the point "O" will engage with the inner face of the prong 3, and at this point this face is disposed along an inclined line 22. In constructing a tong in accordance with our invention, we give this line 22 a direction such that an efficient wedging action will occur when it contacts with the face of the tubing, when the handle 4 is pulled forward, or in the direction indicated by the arrow in Fig. 1. Referring again to Fig. 1, C—O indicates a line drawn from the center of the bolt 10 to the point of contact between the line or face 22, where the tubing and prong 3 are in contact. The line O—A indicates the direction of a tangent drawn to the tubing at this point. The line O—B is a line drawn substantially at right angles to the line C—O. The angle AOB is called the wedging angle of this face 22, and this angle is a complement of the angle COA. We construct the tong so that the angle AOB is between the limits of 12° and 20°. In other words, so that the complementary angle COA is between the limits of 78° and 70°. Beyond the point of contact O, the face 22 inclines in a general direction toward the pad 14. In other words, the inclination of this face 22 increases gradually toward the inner end of the socket 5. It is advantageous to have this wedge angle begin with an angle of about 12° to 17°, continuing this angle for about half the distance along the wedge face, then increasing the wedge angle to between 17° to 20°. This enables the wedge face to compensate for wear on it, and prevents the tubing from ever going all the way back into the socket. The wedge angle starting with 12° to 17°, and ending with 17° to 20°, gives adequate take-up and adequate "bite" for the bit 13 on the tubing, which may be 1/16th of an inch over-size, or even 1/8th of an inch under-size, and allows about 1/8th inch for wear on the face before the wedge face must be built up, or redressed, as by welding. The wedge face 22 is smooth so that it will slide easily over the surface of the tubing. It may be faced with hard metal, if desired.

The tong is so constructed that a line drawn from the point O to the inner edge of the bit 13, is located outwardly in the socket, so that this line is a considerable distance beyond, or outside of the center 23 of the pipe.

What we claim is:

1. A pipe tong comprising a handle having a head rigid therewith, said head having a pair of oppositely disposed prongs forming a constantly open receiving socket for receiving the pipe, an arcuate jaw pivoted to one prong, having two bearing points for engaging the pipe separated from each other circumferentially, and engaging the side of the pipe on the same side of a diametrical line through the pipe, the opposite prong having a smooth wedge face inclined so as to engage the pipe with a wedging action when the handle is swung forward, spring means for urging the outer bearing point of the jaw against the pipe, and a stop engaged by the arcute jaw and cooperating with the spring means to hold the arcuate jaw in a position to maintain the receiving socket open.

2. A pipe tong comprising a handle having a head rigid therewith, said head having a pair of oppositely disposed prongs forming a constantly open receiving socket for receiving the pipe, one of said prongs being of arcuate form, an arcuate jaw pivoted to the arcuate prong so that the arcuate pivoted jaw conforms in outline to the arcuate prong, said jaw having an outer bearing point in the form of a bit set in the jaw and a second bearing point in the form of a face disposed circumferentially from the bit, said bit and said face being located on the same side of a diametrical line through the pipe, the opposite prong having a smooth wedge face inclined so as to engage the pipe with a wedging action when the handle is swung forward, and spring means for urging the jaw in a direction to cause the bit to bite against the wall of the pipe.

3. A pipe tong comprising a handle having a head rigid therewith, said head having a pair of oppositely disposed prongs forming a constantly open receiving socket for receiving the pipe, one of said prongs being of arcuate form, an arcuate jaw pivoted to the arcuate prong and conforming in curvature to the same, said pivoted jaw having an outer bearing point in the form of a bit set in the jaw and having an inner bearing point for engaging the pipe separated circumferentially around the pipe from the bit, a spring exerting force on the arcuate jaw to hold the bit projecting inwardly beyond the inner face of the arcuate prong, the opposite prong having a smooth wedge face inclined along a line forming an angle of approximately 73° to 78° with a line joining the pivotal axis of the jaw to the point of contact between the said opposite prong and the pipe, said smooth wedge face and said bit cooperating after a tightening pull has been exerted on the handle, to enable said tong to maintain itself on the pipe.

4. A pipe tong comprising a handle having a head rigid therewith, said head having a pair of oppositely disposed prongs forming a constantly open receiving socket for receiving the pipe, an arcuate jaw pivoted to one prong, having an outer bearing point in the form of a bit set in the jaw and having an inner bearing point in the form of a face for engaging the pipe separated circumferentially around the pipe from the bit, the opposite prong having a smooth wedge face inclined along a line forming an angle of approximately 73° to 78° with a line joining the pivotal axis of the jaw to the point of contact between the said opposite prong and the pipe, said smooth wedge face being disposed in a curve extending in the general direction of the said second bearing point so that the said angle gradually increases at the point of contact of the wedge face when the pipe moves inwardly in the socket, a spring urging the pivoted arcuate jaw to hold the bit projecting inwardly beyond the inner edge of the prong to which the arcuate jaw is pivoted, and a stop for the arcuate jaw limiting the inward movement of the bit into the socket.

5. A pipe tong comprising a handle having a head rigid therewith, said head having a pair of oppositely disposed prongs including an arcuate prong, forming a receiving socket for receiving the pipe, an arcuate jaw pivoted to one prong, having two bearing points including a bit for engaging the pipe, said bearing points separated from each other circumferentially, and located on the same side of a diametrical line through the pipe, the opposite prong having a smooth wedge face inclined so as to engage the pipe with a wedging action when the handle is swung forward, spring means for urging the outer bearing point of the jaw against the pipe, a stop for the arcuate jaw to hold the bit projecting inwardly beyond the inner face of the arcuate prong, said tong cooperating with the pipe so that the bit engages the pipe in such position that a line drawn from the bit to the point of contact between the pipe and the wedge face will pass the center of the pipe in a plane located further out in the socket than the center of the pipe.

6. A pipe tong comprising a handle having a head rigid therewith, said head having a pair of oppositely disposed prongs forming a constantly open receiving socket for receiving the pipe, an arcuate jaw pivoted to one prong, and projecting outwardly beyond the extremity of the prong to which it is attached, that prong having a pair of flanges between which the jaw lies, a bit fitting into said jaw, lying between the said flanges and retained thereby against falling out of the jaw, said bit constituting a bearing point for engaging the pipe, said jaw having a second, rearwardly projecting bearing point for engaging the pipe separated circumferentially around the pipe from said bit, so that the bit and said bearing point are located on the same side of a diametrical line through the pipe, the opposite prong having a smooth wedge face inclined so as to engage the pipe with a wedging action when the handle is swung forward, a spring means for urging the jaw in a direction to cause the bit to bite into the wall of the pipe, and a stop for said arcuate jaw for maintaining the same always in a position such that the bit is always maintained between said flanges.

7. A pipe tong comprising a handle having a head rigid therewith, said head having a pair of oppositely disposed prongs forming a receiving socket for receiving the pipe, one of said prongs having a pair of spaced flanges, an arcuate jaw pivoted to the same and lying between the said flanges, a bit set in the said jaw between the flanges and retained in the jaw by said flanges, a spring associated with the jaw and urging the same to rotate in a direction to swing the bit inwardly in the socket, and a stop for limiting the said inward swinging of the jaw so that the bit is constantly located between said flanges, and prevented thereby from falling out of the arcuate jaw.

8. A pipe tong comprising a handle having a head rigid therewith, said head having a pair of oppositely disposed prongs including an arcuate prong, forming a constantly open receiving socket for receiving the pipe, an arcuate jaw conforming in curvature to the arcuate prong and pivoted to the same, said jaw having an outer bearing point in the form of a bit set in the jaw, and having an inner bearing point for engaging the pipe separated circumferentially along the arc of the jaw and around the pipe from the bit, said bit and said bearing point located on the same side of a diametrical line through the pipe, the opposite prong having a smooth inclined wedge face inclined at its point of contact to the side of the pipe and having a wedging angle of approximately 12° to 17° substantially as described, and means for yieldingly holding the arcuate jaw in position so that the bit projects inwardly beyond the inner edge of the arcuate prong.

JOHN D. CHESNUT.
RICHARD K. HERTEL.